United States Patent [19]

Cailliot

[11] 4,204,964
[45] May 27, 1980

[54] CONTINUOUS CENTRIFUGAL FILTER FOR VARIOUS FILTERING AND AUTOMATIC COFFEE MAKING

[75] Inventor: Serge Cailliot, Neuilly-sur-Seine, France

[73] Assignees: Societe Normande de Services, Boulogne; Agence Nationale de Valorisation de la Recherche (ANVAR), Neuilly-sur-Seine; Societe Generale pour le Financement de l'Innovation, Soginnove, Paris; Bertrand Cor, Paris; Arnaud Gastinne, Paris, all of France; part interest to each

[21] Appl. No.: 911,696

[22] Filed: Jun. 1, 1978

[30] Foreign Application Priority Data

Jun. 2, 1977 [FR] France .............................. 77 16927

[51] Int. Cl.² .............................................. B01D 33/14
[52] U.S. Cl. ................................. 210/370; 210/373; 210/380 R; 210/DIG. 4
[58] Field of Search ....................... 210/66, 67, 77, 78, 210/160, 359, 360 A, 360 R, 369, 370, 372, 373, 377, 300 R, DIG. 4, 325; 99/289 T, 302 C

[56] References Cited

U.S. PATENT DOCUMENTS

| 1,950,869 | 3/1934 | Stuart | 210/380 |
| 2,321,207 | 6/1943 | Howe | 210/380 |
| 3,358,840 | 12/1967 | Pinkava | 210/DIG. 4 |

FOREIGN PATENT DOCUMENTS

691923   5/1940   Fed. Rep. of Germany .

*Primary Examiner*—Frank Sever
*Attorney, Agent, or Firm*—Brisebois & Kruger

[57] ABSTRACT

Continuous centrifugal filtering device for precipitation, washing or draining. The rotative cylindrical sleeve is constituted of a helical winding with continuous coils of a long strip mounted in a rotative case including cylindrical rollers engaging the exterior of the cylndrical sleeve, and driven in rotation at slow speed, all in the same direction. The strip forming the cylindrical sleeve is looped in an endless assembly by a return coil which extends from one extremity to the other of the helical winding so that the porous cylindrical sleeve thus formed advances slowly axially renewing itself constantly. The device can be used for making coffee.

13 Claims, 5 Drawing Figures

CONTINUOUS CENTRIFUGAL FILTER FOR VARIOUS FILTERING AND AUTOMATIC COFFEE MAKING

SUMMARY OF THE INVENTION

This application is related to French application No. 77-16927, filed June 2, 1977, and the disclosure thereof is incorporated by reference.

The invention relates to filtering in general, and more particularly to the preparation of coffee.

It is known that the operation of filtering in general consists in making a liquid pass through a porous wall which retains solid particles, these solid particles being previously contained in suspension in the liquid, in the case of filtering for precipitation. On the contrary, the solids are first placed in the filter, then moistened by liquid when one performs washing or draining operations with an appropriate solvent for the active soluble substances contained in the solid particles. This is the case, in particular, in the preparation of coffee which consists in passing hot water through ground coffee.

In the simplest case, the passage of the liquid through the solids is brought about by simple gravity. One can, however, improve the effectiveness of the filtering by making the liquid pass by the effect of centrifugal force, by using a porous cylindrical wall driven in rotation at great speed around its axis. In both cases, the filtering operation is necessarily intermittent, in that filtering phases are followed by cleaning phases for the removal of solid substances accumulated on the porous wall.

Continuous filters are known, however, in which an endless porous wall is used, either in the form of an endless band, or in the form of a rotating cylinder, and in this case there is a filtering zone or sector followed by another cleaning zone or sector, the cleaning being obtained generally by scraping with a fixed scraper, then unclogging of the porous wall by a rinsing in the reverse direction. In the case of such continuous filters, the passage of the liquid is done forcefully by gravity or by suction but not by a centrifugal method, the displacement or the rotation of the porous wall being necessarily slow since it is the displacement of the wall which provides for the succession of filtering and washing operations.

It is then absolutely not possible, in the state of the art, to take advantage of automatic continuous filtering and the efficiency of centrifugal filtering at the same time.

The object of the invention is to overcome the preceding disadvantages by providing a filter which is both centrifugal and continuous, while being a relatively simple embodiment, and which does not need any unclogging rinse.

The invention consists of constituting the porous filtering wall or sleeve of a continuous cylindrical helical winding from a continuous flexible strip of small cross-section, this wall being mounted between several elongated guiding and driving rollers placed around the circumference of the cylinder, and mounted in a cage rotatable at great speed around the axis of the cylinder, while the rollers turn also around their axes at a low speed in relation to the cage, to give the assembly of the cylindrical wall a relative differential rotation, the strip being curled in an endless assembly so that in this relative movement it constantly unrolls from one open extremity of the cylinder and rolls constantly onto the other extremity, preferably around a closed end, the slow movement of differential rotation being consequently accompanied by a continuous axial displacement of the wall in the direction of the open extremity, the product to be filtered being fed by one or more appropriate conduits to the neighborhood of the bottom, while the centrifuged filtrate is collected by a housing exterior to the case, and the drained solid residue is ejected continuously from the open extremity of the cylinder.

Other characteristics of the invention will become apparent in the description which follows of one embodiment taken as an example and shown in the attached drawings, in which.

Figure 5:
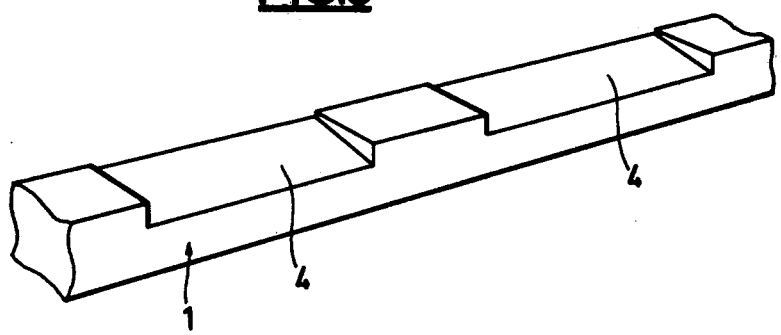
FIG. 5 is an enlarged partial view in perspective of a part of the flexible strip constituting the filter wall.

Conforming to the invention, the porous filtering wall comprises a long continuous flexible strip 1, of small cross-section helically wound to form a cylindrical sleeve 2. A return winding 3 of the strip extends between the ends of sleeve 2 to make an endless assembly. This flexible strip 1 can be of metal or of plastic material, preferably of square or rectangular cross-section, and advantageously has on its upper or lower surfaces, recesses or notches 4 (FIG. 5), preferably inclined, to widen towards the exterior of sleeve 2 and beginning with a very small depth at the inside of the sleeve 2, this depth corresponding to the fineness of filtering desired, and being for example 0.1 mm.

The cylindrical sleeve 2 thus constituted is mounted in a cage constituted of a plurality of cylindrical rollers 5, four in number in the drawings, each placed according to one generatrix of the cylinder. Each of these rollers is journalled at its bottom in a lower support plate 6 and near its upper end, in notches 8 in an upper support plate 7. The notches 8 open towards the center of a central opening 9 of plate 7, opening 9 having a diameter just sufficient to permit the passage of sleeve 2. The upper support plate 7 is rigidly fixed to the lower support plate 6 by tie bars 10 and the lower support plate 6 is itself rigidly fixed by its hub 11 to a central shaft 12 rotatable in fixed bearings 13, the shaft 12 being driven by a driving motor not shown, and which can be located below the bearings 13.

The entire assembly of the cage, comprising the two support plates and the four vertical rollers, rotate then as a unit around shaft 12 at a speed appropriate to obtain centrifugal filtering, for example 1500 revolutions per minute. In addition, the four rollers 5 are driven to rotate about their own axes, each in the same direction, by an appropriate mechanism located below support 6.

Figure 1:
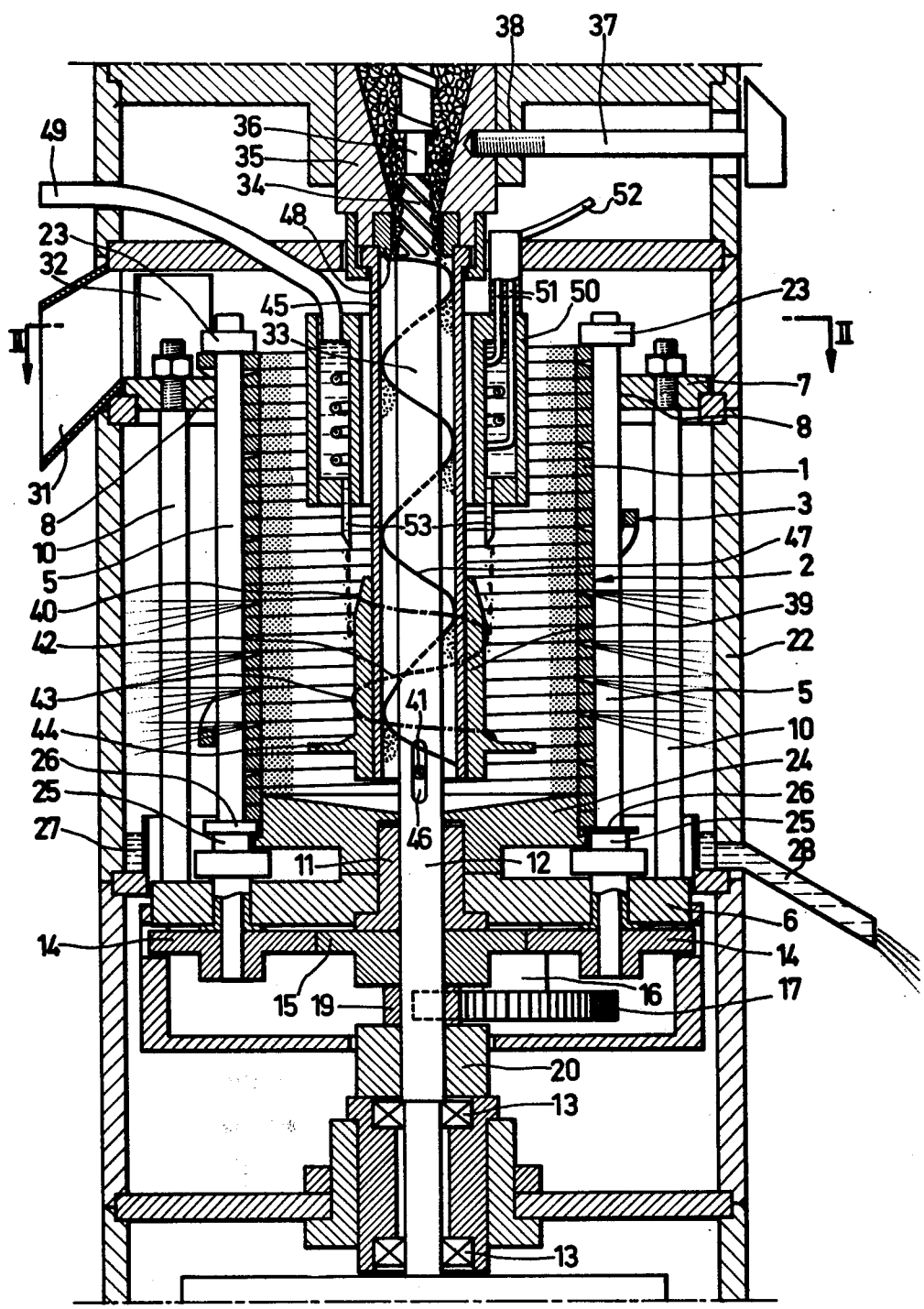
FIG. 1 is a view in vertical section of a filtering device of the invention applied to a coffeemaking machine.
Figure 4:
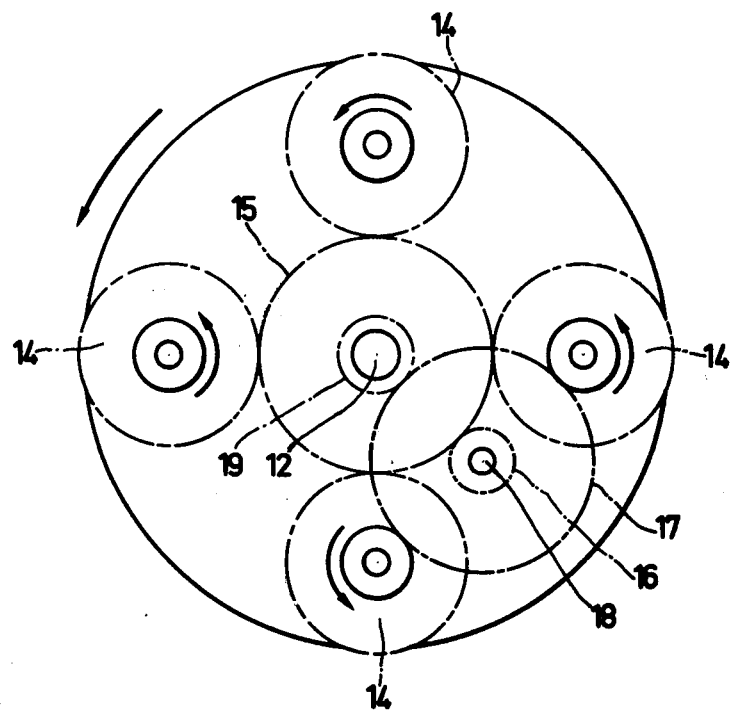
FIG. 4 is a view in section taken along line IV—IV of FIG. 3 showing the gear positioning and meshing.

This roller drive mechanism, shown in particular in FIGS. 1 and 4, comprises a gear 14 fixed to each of the lower extremities of rollers 5, below support plate 6; the four gears 14 meshing simultaneously with a single central idler gear 15 freely rotatable on shaft 12, this central gear being itself driven in rotation by a pinion gear 16 integral with a gear 17 which rotates on an axis 18 mounted on support plate 6. Gear 17 meshes with a central idler pinion 19 mounted to freely rotate on shaft 12. A base 20 keyed to pinion 19 can be immobilized in rotation by means of an appropriate device such as a remotely operated brake, not shown. The directions of rotation of the gears are those shown by the arrows in FIG. 4, recalling that it is a view from below, and the gear ratios are such that the rollers 5 revolve about their own axes at a very slow speed while the cage assembly turns at a high speed.

Figure 2:
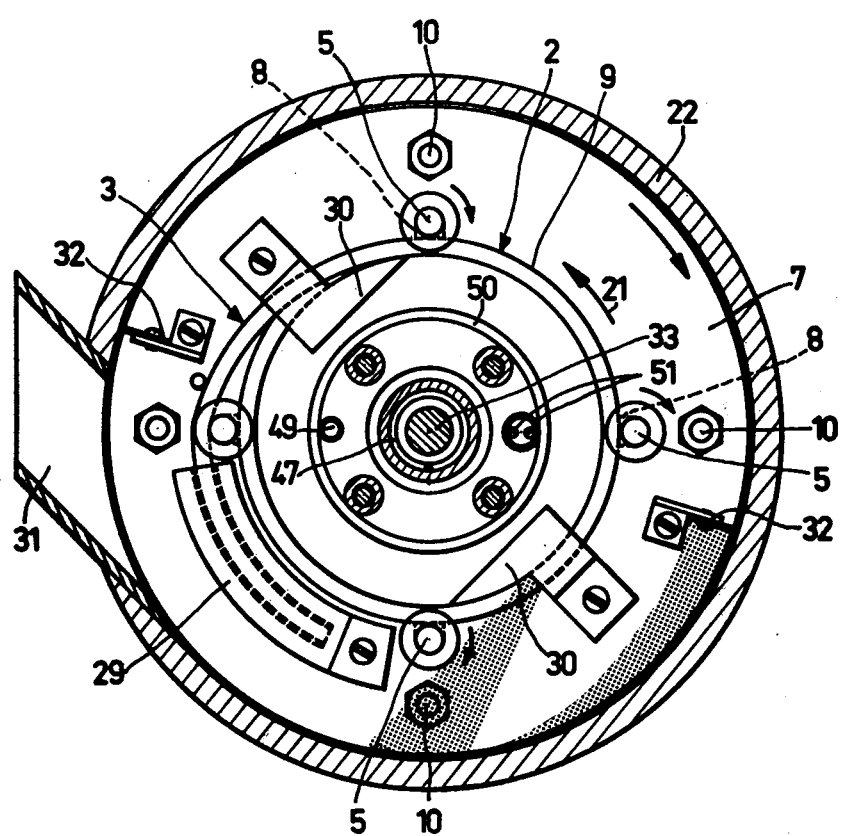
FIG. 2 is a view in section taken along line II—II of FIG. 1.
Figure 3:
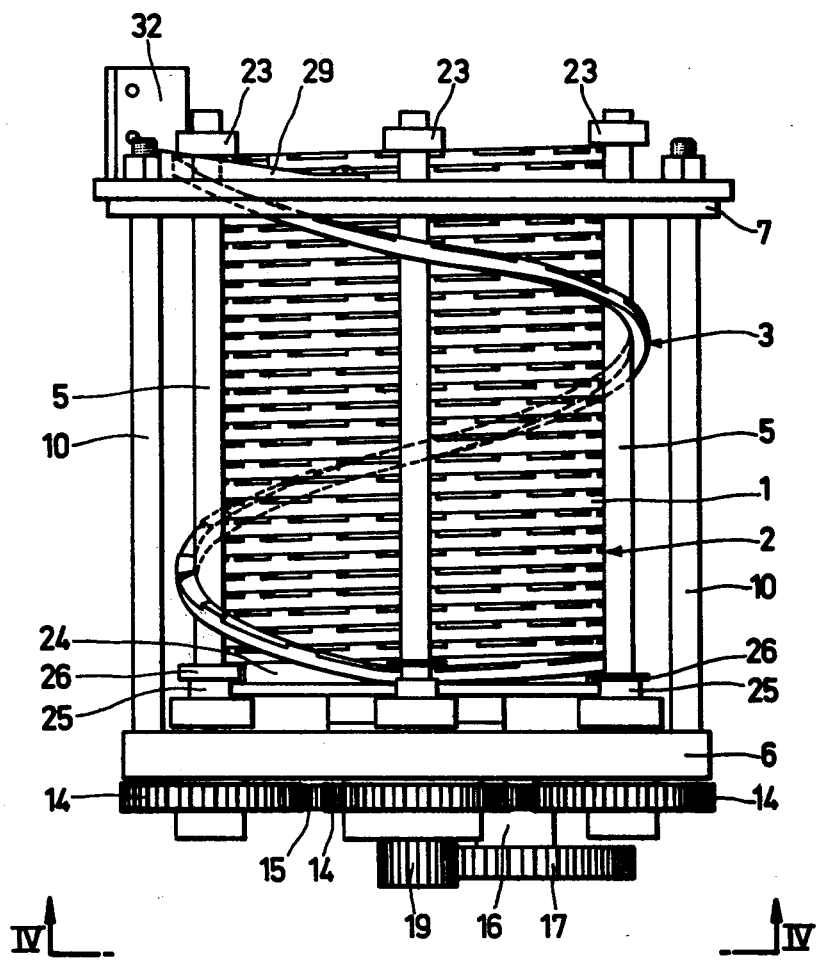
FIG. 3 is a front view in elevation showing essential parts of the filter in its housing.

Under these conditions, sleeve 2 comprised of the continuous winding is forced centrifugally against the guiding and driving rollers 5, and consequently the sleeve begins to turn slowly on itself in the direction of the arrow 21 (see FIG. 2), and relative to its cage at a slow rotational speed on the order of 12 turns/mn in the chosen example. Of course, if one observes from housing 22 of the apparatus rather than from the cage, sleeve 2 turns in reality in the same direction as the cage, that is in a clockwise direction in FIG. 2, and at a slightly lower speed, for example 1500 turns/mn for the cage and 1448 turns/mn for the sleeve. As a variation, it would naturally be possible to modify the arrangement to make the sleeve turn in a direction such that its slow differential speed adds to the speed of the cage instead of subtracting from the cage speed.

Furthermore, the direction of winding of the continuous winding of sleeve 2 is chosen in such a manner that, in the above-mentioned relative movement of the sleeve in relation to the cage, the strip 1 unwinds itself at the upper end, just after its passage under one of the axial retention flanges 23 of one of rollers 5, then forms the return winding 3 by passing outside rollers 5, but preferably inside tie bars 10 to wind continuously to the lower end of the sleeve 2, on the exterior cylindrical surface of a bottom wall 24 (visible in FIG. 1) freely rotatable on hub 11 to be able to make the slow rotating movement of the filter assembly. This movement is communicated to bottom wall 24 by engagement or by friction on its periphery by a driving region 25 at the base of rollers 5 below axial retaining flanges 26.

In this manner the rolling or winding to force a new coil continuous with the preceding causes the sleeve assembly to progress slowly upwardly toward its open extremity, the number of coils forming sleeve 2 being constant which permits flanges 23 and 26 to maintain the coils effectively touching, with a light pressure or a calculated clearance. In the embodiment disclosed, a coil in the lower position takes about 2 minutes 36 seconds to arrive at the top to complete a cycle (when the cage is rotated at 1500 rpm).

It is understood that with such a filter, it is sufficient to introduce one or more products to be filtered axially, and to place them for example on bottom wall 24, so that these products are projected onto the interior surface of sleeve 2 where the filtering takes place, the filtrate being projected tangentially against the housing wall 22 which encircles the cage to flow out then by a peripheral channel 27, toward a discharge spout 28, while the solid residue progresses slowly toward the top while being systematically drained centrifugally until drained, and finishes by being ejected by centrifugal force above the last upper coil, that is above upper support plate 7. To avoid the return of solid residue toward the lower compartment, the upper beginning of the return coil 3 goes through the support plate 7 through a close fitting opening enclosed by a close fitting cover 29.

Being given that strip 1 once uncoiled no longer comprises any perforation, but simply slight notches, no unclogging, nor any rinsing is necessary. At best all that is required is a scraping or wiping of the three smooth surfaces of the strip, and eventually a brushing of the surface containing notches 4 with a fixed or rotating brush connected for example to one of rollers 5, where the centrifugal force would not be sufficient to eject the solid residue. To facilitate the removal of the solid residue one can likewise have two scrapers or shovels 30 placed in a fixed position and inclined downwardly toward the interior of the last upper coil of the sleeve to remove the solid residue before the beginning of the unrolling of the strip. These solid residues are then in any case projected by centrifugal force against the housing wall 22, but in the upper compartment where they are removed by a tangential outlet 31. Two flexible blades 32, fastened vertically on the top of support 7 to engage the interior surface of wall 22, facilitate the gathering and the removal of the solid residue.

With such a filter, one can then continuously feed into the axis or center the heterogeneous mixture to be separated, or the ground product and the liquid separately in the case of washing or of draining, and remove continuously the solid residue at the upper part of the unit and the filtrate at the lower part of the unit, as a continuous operation without the need to stop for cleaning. This continuity of mechanical operation and this automatic cleaning are not however necessarily related to the continuity in time of operations. In fact, if one desires, one can make the filter, according to the invention, operate by successive loading by simply providing a device controlled from the base 20 for braking the central pinion 19 in relation to housing 22. Braking pinion 19 causes rotation of sleeve 2 with respect to its cage. It is sufficient then at first to feed the products while braking the pinion, which permits by the rising of the spiral to distribute the products, then in a second time period to eliminate the braking which eliminates at the same time the differential movement of the spiral with respect to the cage which stops consequently its rising movement while continuing to turn at great speed, and which permits the operation of filtering and of draining as long as is desired. Finally, in a third time period, it is sufficient to reactivate the brake of part 20 to again produce the rise of the spiral and the removal of the solid products, this phase being able to be combined with the first phase of the next cycle.

For the application to coffee making, the filtering device of the invention has in addition the advantage that it is possible to lengthen shaft 12 by providing an upper part 33, detachable or not from the lower part and placed in the axis of cylindrical sleeve 2, to drive, at the upper part, a grinder of known type to grind the coffee. For this purpose a grinder 34 is formed directly on the upper extremity of shaft portion 33 and rotates in an exterior grinding cone 35 having a conical interior and situated at the base of a hopper (not shown) feeding the grains of coffee to an adjustable flow feeder 36 which can be driven by the shaft 12. The adjustment of the fineness of the grinding is done, for example, by moving the cone 35 vertically by helically moving it with a control rod 37 sliding in an inclined helical slot 38 formed in cover element connected to housing 22. The shaft 12 and its upper portion 33 and grinder 34 are of course fixed against axial movement.

When one uses the filter of the invention for washing or extracting a liquid from a solid ground substance, one is interested in distributing first of all the solid substance near bottom 24 in a uniform cylindrical layer, and then in distributing or dispensing the liquid above the location where the solid is distributed. This can be done very easily according to the invention by placing a rotative coaxial distributor 39 containing a central passage for the solid product and having an exterior at least partially conical surface 40 on to which the liquid flows and which is thus projected outwardly by centrifugal force. The distributor 39, for this purpose, is driven in rotation, for example, at the speed of shaft 12 by being joined to the latter by a pin 41 going through both the distributor and the shaft. As a variation this distributor could be joined to bottom wall 24 by pins parallel to the shaft, the speed of the bottom being, as previously stated, higher but very little different from that of the shaft 12.

The exterior conical surface 40 of distributor 39 can be prolonged by a cylindrical part which comprises preferably irregularities to distribute the liquid spray over a certain height. For example, these irregularities can be a rib or vein 42 in the form of a helical spiral extending over the exterior cylindrical surface 43 of the distributor. In addition, a circular flange 44 acting as a deflector can be placed at the base of the distributor to evacuate the gutters of liquid which could eventually fall beyond the exterior surface of the distributor.

For application to a coffeemaker, the ground coffee can be fed to the inside of the axial passage of the rotative distributor 39 by any appropriate means. Particularly, if one uses a shaft 33 and a coaxial grinder 34 as explained above, one can exactly place this distributor coaxially around this shaft by axially extending it by a tubular part 45 whose upper extremity is rotatably mounted at the base of the grinding cone 35. Where cone 35 moves axially to permit the adjustment, as indicated above, an oblong slot 46 is provided in the shaft 33 for the passage of pin 41, to permit this movement to occur.

In this case the ground coffee which is fed directly between shaft 33 and the tubular part 45 undergoes the risk of being plastered by centrifugal force against the inside of latter and of accumulating there. This is avoided in the invention by placing a fixed spiral of helical steel wire 47 in the space between shaft 33 and the internal diameter of tube 45 and rotative distributor 39. Wire 47 is immobilized axially and in rotation by fastening its upper extremity 48 in the base of cone 35. In this manner the ground coffee is sent regularly and without possibility of blockage to the lower extremity of the distributor 39 where it is thus dispensed by centrifugal force into the space between bottom wall 24 and flange 44 to accumulate on an area of the same height on the inner surface of sleeve 2.

Always in the case of the coffeemaker, the liquid substance, which is obviously warm water, can be supplied and heated continuously and dispensed onto the conical part 40 of the distributor 39. It is, however, preferable in the invention to dispense the water intermittently by supplying by a continuous flow a device well known in physics by the name of intermittent fountain and made of a self-priming siphon placed in a container (not shown) which fills up gradually and empties itself by the effects of a siphon. In this case, the capacity of the container between the high level and the low level is preferably equal to one cup of coffee.

Cold water or preferably preheated water is then dispensed by a continuous dispenser, such as a pump, to the intermittent fountain, which dispenses it through a tube 49 to a small capacity chamber 50 in the shape of an annular sleeve disposed coaxially outside tube 45 but which does not rotate. This capacity chamber 50 has a resistance heater 51 energized by wires 52, and flow nozzles 53 are made all around its bottom, above the conical surface 40 of distributor 39. In this way the water is heated or reheated by this resistance before flowing onto the distributor and, from there, is projected onto the cylindrical layer of coffee before passing through the latter and being drained against housing wall 22.

The periods of arrest of the intermittent fountain have two advantages, the first being that the flow of coffee to spout 28 is stopped. thus permitting removing a full cup and replacing it with an empty cup without loss of coffee, and the second being that at the time the next volume of water enters the chamber and flows on the heater some steam is produced from this water which makes the coffee grounds swell which had been distributed in the space near the bottom 24.

One can thus distinguish on the inner surface of sleeve 2 and from bottom to top three distinct successive progressively increasing regions, the first, this is the lowest, corresponding to the dispensing zone of the coffee and its swelling from steam, the second situated at the height of rib 42 corresponding to the wetting zone of the coffee which produces the maximum liquid coffee by centrifugal passage, and the third, above the second, corresponding to the drainage thrust from the ring of residue to recapture the last drops of coffee and to remove the practically dry residue at the upper part by the general means indicated above. Of course, the spout for evacuation of residue 31 is directed toward a residue vat which is part of the apparatus and which is emptied periodically. The apparatus likewise comprises a tank for water if one desires to avoid a pipeline connection.

Thus it can be seen that the apparatus of the invention, with relatively simple means which are all mounted coaxially on the same shaft, except for the various tanks, permit the rapid and automatic realization of all the operations of grinding, dispensing, vaporizing, pouring, filtering and draining as well as cleaning of the filter and removal of the residue, the apparatus being able thus to function in an absolutely uninterrupted manner and to produce as great a number of cups of coffee as one desires by simply feeding it and emptying its residue tank without it being necessary to stop it. Inversely, it is perfectly possible to stop its production when one wants, by stopping the supply of water, then the motor after a given time, the production being resumed immediately when one wants it, provided that the water has been maintained at the necessary temperature.

Although the embodiment disclosed has a vertical axis of rotation, this axis could be positioned at any other angle, for example horizontally, the rotating distributor 39 being then in this case replaced by simple fixed conduits, and bottom 24 being also modified.

What is claimed is:

1. A centrifugal separator comprising a support assembly comprising plural guide rods, endless band means on said support assembly, said endless band means being sufficiently stiff to provide means for positioning a helically wound wall portion entirely within said guide rods, a such helically wound wall portion defining a separator, and a return portion mounted around said rods and extending along a generally helical path between the ends of said helically wound wall portion, said guide rods being rotatably mounted on said support assembly and circumferentially spaced around and engaging said helically wound wall portion of said band, combined drive means for driving the entire support assembly in rotation about the central axis of said assembly and for simultaneously driving at least one of said plural guide rods so as to revolve said helical wall portion relative to said support and provide movement of said band relative to said support along said helical path, generally about the central axis of said assembly to thereby cause continuous unwinding of the band from one end of the helical wall portion and rewinding of the band at the other end of the helical wall portion, said combined drive means being designed so that said rotation is substantially faster than said movement of said band along said helical path.

2. A separator according to claim 1 wherein said helically wound portion of said band comprises a cylinder having a vertical axis, and said means for revolving the helical portion comprises means for revolving the helical portion in a direction to unwind the band from the upper end of the helical portion and rewind the band at the lower end of the helical portion.

3. A separator according to claim 1 wherein said endless band is of rectangular cross-section with three smooth faces and a radial face having notches therein which increase in size toward the exterior of the helically wound portion, said notches defining separator openings.

4. A centrifugal separator according to claim 1, further comprising, guide means for guiding the portion of the band unwound from one end of the helical portion onto the other end of the helical portion.

5. A centrifugal separator according to claim 1, wherein said support comprises a cage including a support annular plate surrounding said one end of the helical portion wherefrom said unwinding occurs, and a support disk plate adjacent said other end of the helical portion whereto said rewinding occurs, means securing said plates together, said guide rods being each journalled through said support disk plate and supported against centrifugal urging by U-shaped notches cut inwardly in said support annular plate, said support annular plate further comprising an opening for said return portion passing through.

6. A centrifugal separator according to claim 5 wherein said means for rotating said support is a driving shaft secured to said support disk plate, and wherein a substantially cylindrical inner end wall is rotatably mounted on an extension of said shaft beyond said disk plate for an idle rotation thereabout, with guide means guiding said band at said other end to rewind it onto the peripheral cylindrical surface of said cylindrical inner end wall.

7. A separator according to claim 6 wherein said means for driving said guide rods comprises a planetary gear system.

8. A separator according to claim 7 wherein said planetary gear system is drived from a single pinion coaxial with said shaft, with controlled brake means for selectively stopping said pinion without stopping said shaft.

9. A separator according to claim 6 wherein said shaft is vertical, with said support annular plate upwardly located, said shaft comprising a further extension connecting it to the rotatable part of a two part grinding assembly further including a stationary part, said separator further comprising a rotatable tubular member coaxially surrounding said further extension and guiding by the annular space therebetween the solid ground particles from said grinding assembly to the center of the upper face of said cylindrical inner end wall, and a stationary coil in said annular space for preventing any obstruction therein.

10. A separator according to claim 9 wherein a rotatable liquide deflector is secured to said rotatable tubular member at a distance above said cylindrical inner end wall for intercepting liquid pouring down from a liquid distributor and projecting said liquid onto the inner surface of said helical portion and the solid particles thereon.

11. A separator according to claim 10 wherein said liquid distributor includes means for liquid heating and vapouring, and is feed intermittently with liquid from an auto-priming siphon, the differential capacity of which is the content of a standard coffee cup.

12. A separator according to claim 5, wherein said assembly includes a casing surrounding said support with a first portion thereof, on one side of said support annular plate, for collecting liquid forced centrifugally outwardly through said helically wound portion, and a second portion thereof, on the other side of said support annular plate, for collecting solid particles forced centrifugally outwardly from said one end of the helical portion wherefrom said unwinding occurs.

13. A separator according to claim 1 further comprising means adjacent the unwound end of said helical winding for removing solids from said band.

* * * * *